United States Patent
Yoneyama et al.

[11] Patent Number: 6,052,223
[45] Date of Patent: Apr. 18, 2000

[54] MICROSCOPE WITH CHROMATIC ABERRATION CORRECTING FUNCTION

[75] Inventors: Takashi Yoneyama, Hachioji; Kenji Karaki, Ina; Kazuo Kajitani, Hachioji, all of Japan

[73] Assignee: Olympus Optical Co., Ltd., Tokyo, Japan

[21] Appl. No.: 09/200,655

[22] Filed: Nov. 25, 1998

Related U.S. Application Data

[63] Continuation of application No. 08/774,392, Dec. 30, 1996, abandoned.

[30] Foreign Application Priority Data

Jan. 9, 1996 [JP] Japan .................................... 8-001655
Jan. 23, 1996 [JP] Japan .................................... 8-008928

[51] Int. Cl.⁷ ........................................................ G02B 21/00
[52] U.S. Cl. ............................ 359/381; 359/389; 250/301.3
[58] Field of Search ................................... 359/382, 383, 359/389, 392, 837, 381; 250/201.3

[56] References Cited

U.S. PATENT DOCUMENTS

| | | | |
|---|---|---|---|
| 4,515,447 | 5/1985 | Weimer et al. ........................ | 359/388 |
| 4,769,530 | 9/1988 | Miyahara ................................ | 250/201 |
| 4,935,612 | 6/1990 | Bierleutgeb .......................... | 250/201.2 |
| 4,958,920 | 9/1990 | Jorgens et al. ......................... | 359/392 |
| 5,486,948 | 1/1996 | Imai et al. .............................. | 359/462 |
| 5,633,752 | 5/1997 | Tsuchiya et al. ....................... | 359/390 |

FOREIGN PATENT DOCUMENTS

| | | | |
|---|---|---|---|
| 0007746 | 1/1977 | Japan .................................... | 359/381 |
| 52-7746 | 1/1977 | Japan . | |
| 61-143710 | 7/1986 | Japan . | |

*Primary Examiner*—Cassandra Spyrou
*Assistant Examiner*—Mark A. Robinson
*Attorney, Agent, or Firm*—Frishauf, Holtz, Goodman, Langer & Chick, P.C.

[57] ABSTRACT

A microscope includes a light source for emitting light, a light condenser lens for condensing the light from the light source onto an object, a wavelength selection unit arranged between the light source and the light condenser lens for selecting the wavelength of the light entering the light condenser lens from the light source, a detector for detecting light from the object through the light condenser lens, and an optical path length adjusting unit arranged between the light source and the detector for adjusting the optical path length between the light condenser lens and the detector in order to correct the chromatic aberration of the light condenser lens appearing depending on the wavelength of the light selected by the wavelength selection unit.

10 Claims, 13 Drawing Sheets

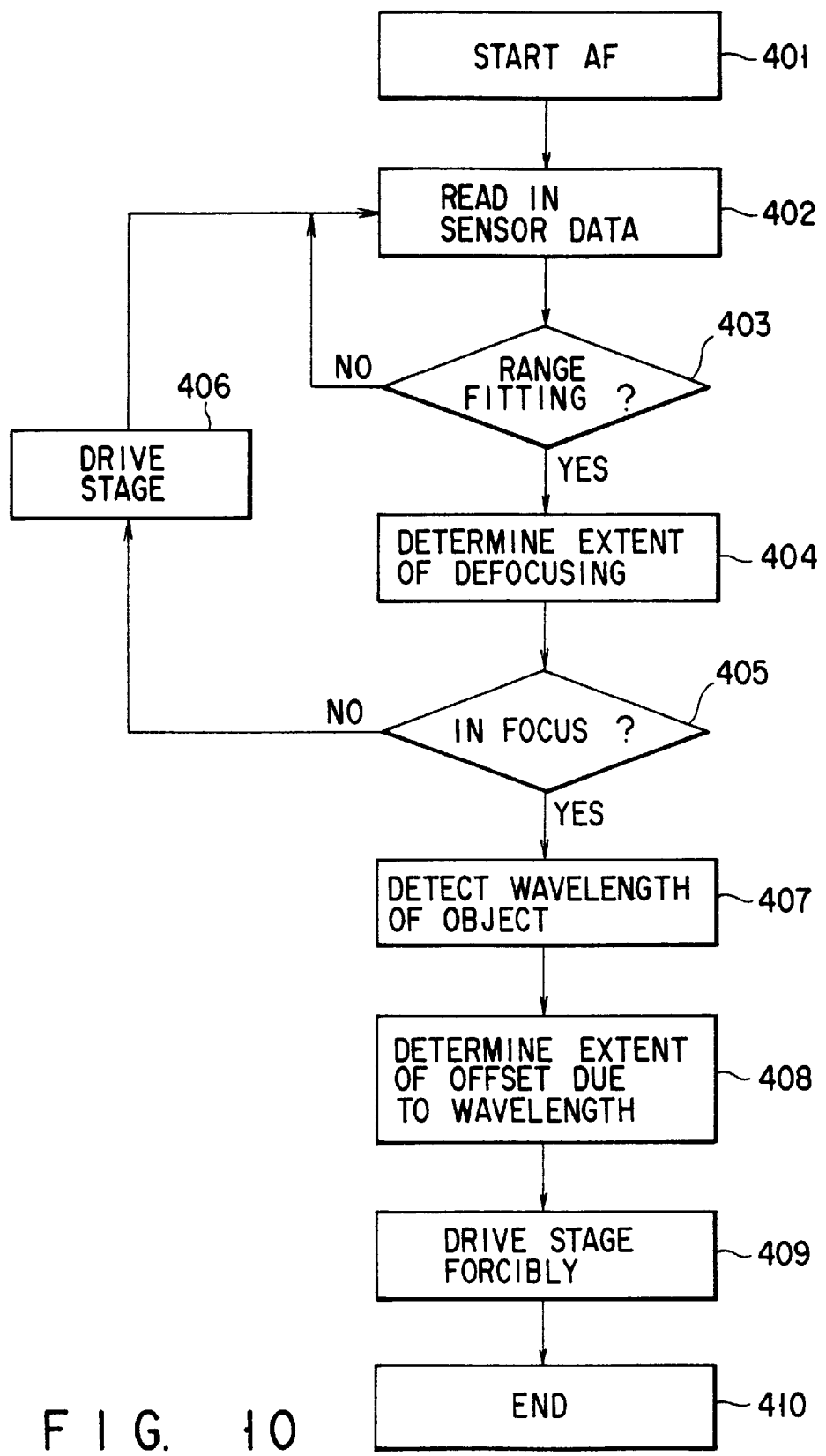
F I G. 10

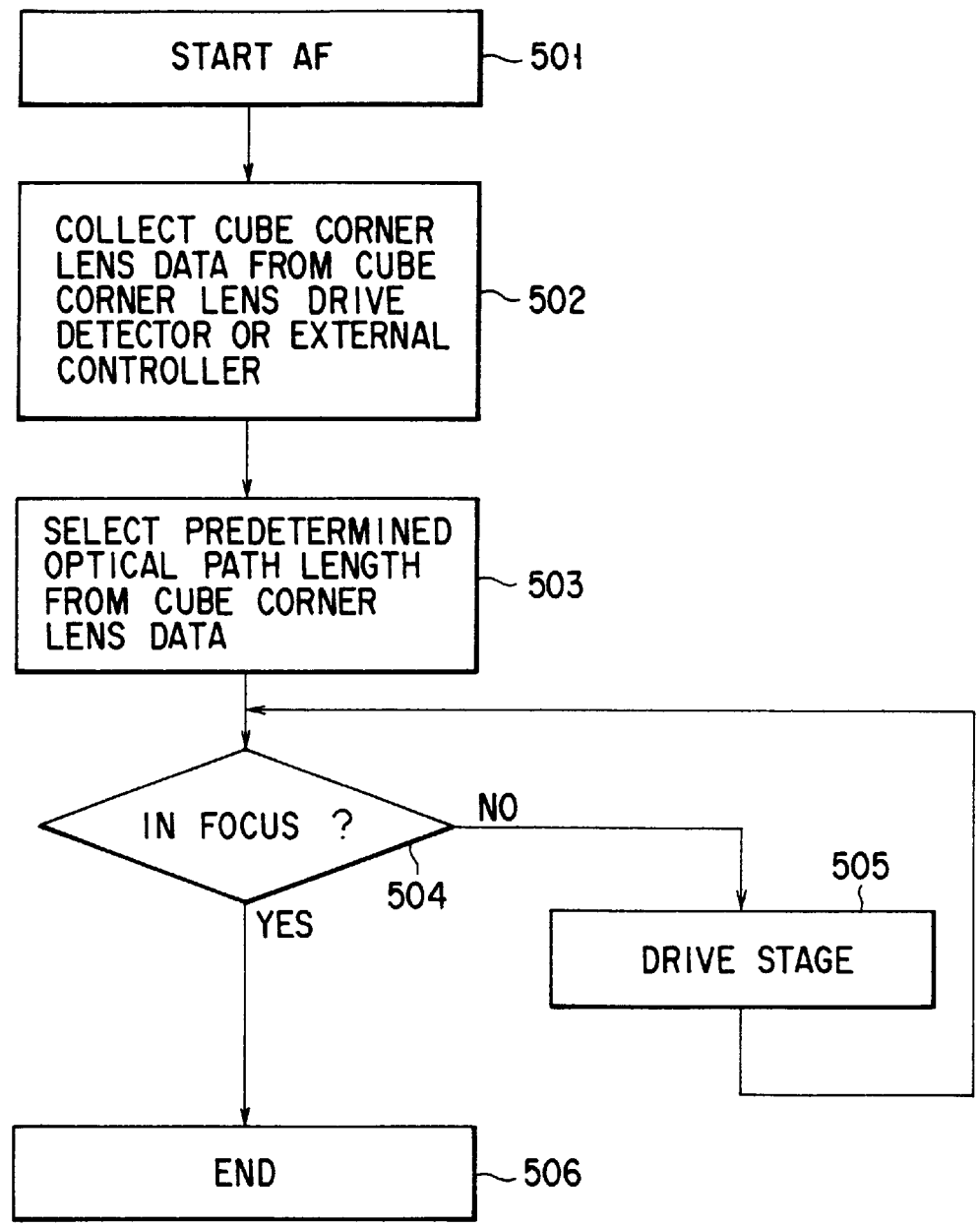
F I G. 11

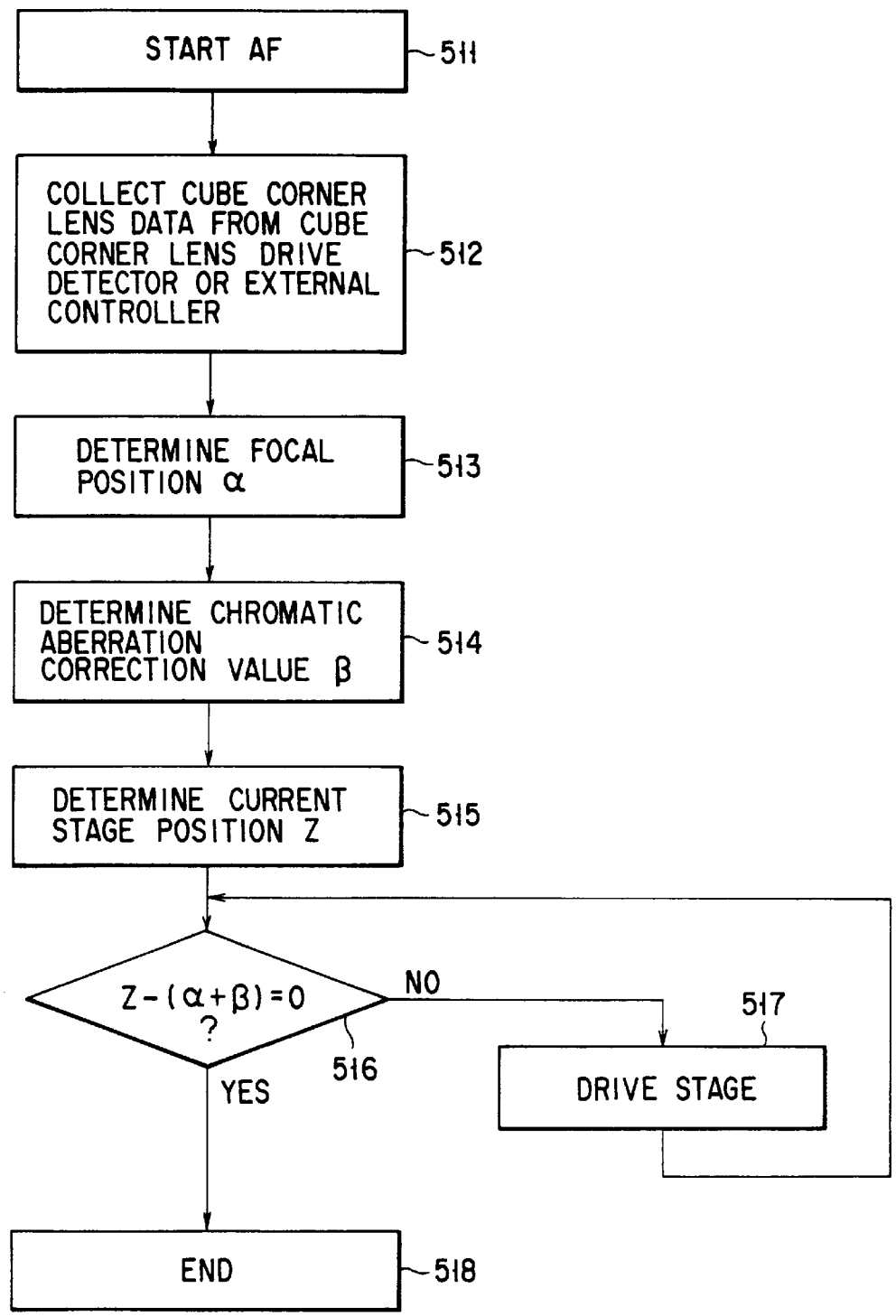
F I G. 12

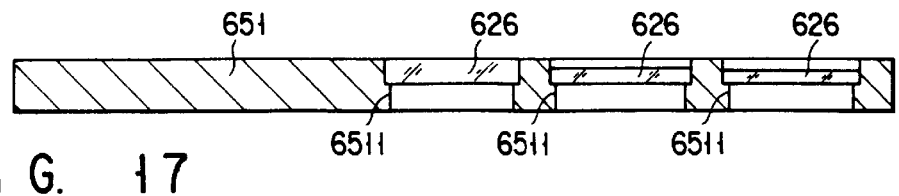
F I G. 17
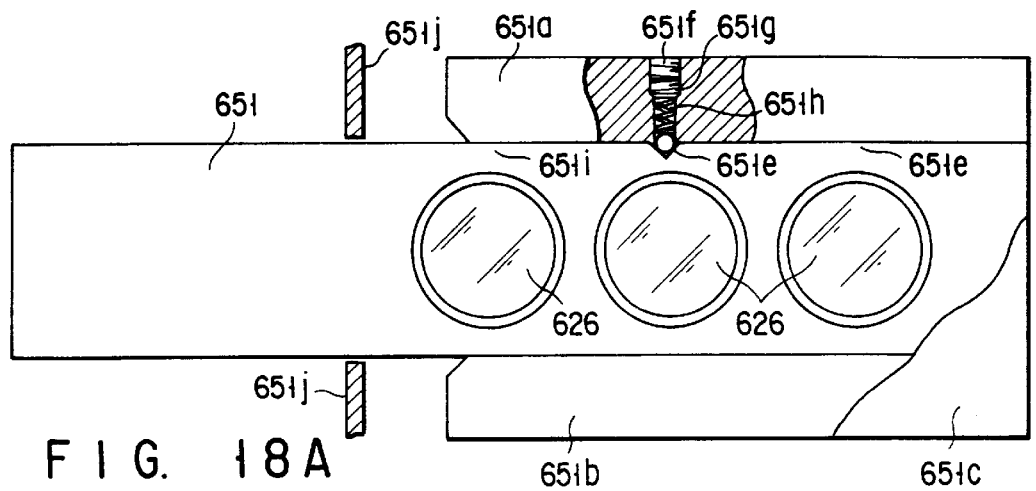
F I G. 18A
F I G. 18B
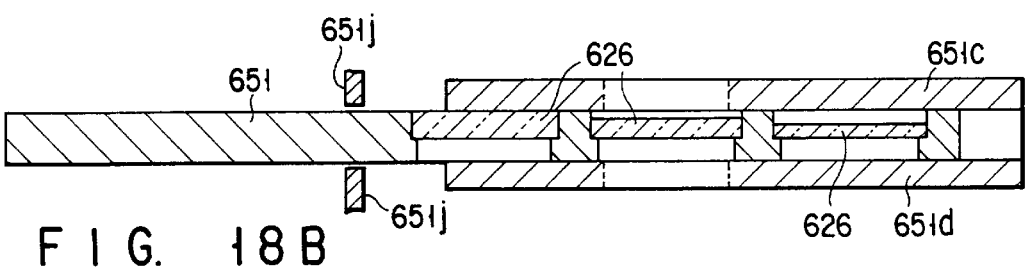
F I G. 19
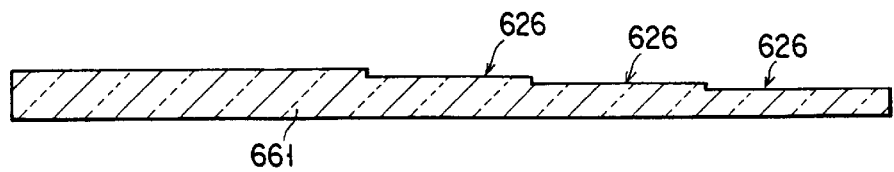
F I G. 20

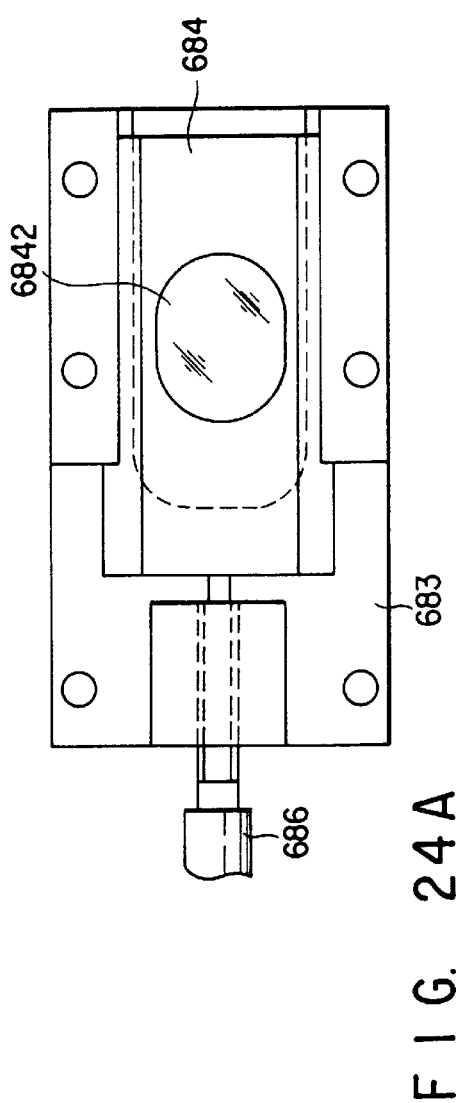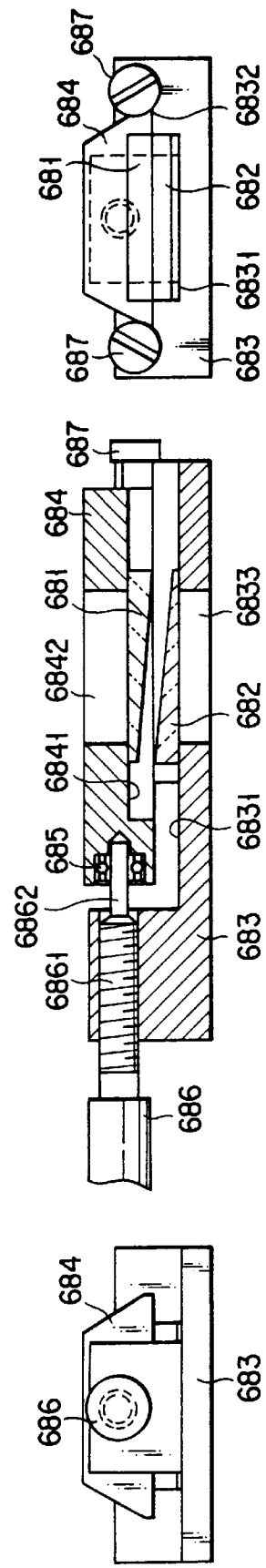

MICROSCOPE WITH CHROMATIC ABERRATION CORRECTING FUNCTION

This is a continuation of application Ser. No. 08/774,392 filed Dec. 30, 1996 now abandoned.

BACKGROUND OF THE INVENTION

This invention relates to a microscope adapted to photomicrography and visual monitoring on a display screen on a selective basis and, more particularly, it relates to a microscope capable of detecting the focal point in an improved way and also to an automatic focusing apparatus.

There are known microscopes adapted to photographing specimens and visually monitoring them on an electronic display screen. Microscopes with such functional features are generally accompanied by a problem of focusing difficulty when the objective lens has a low magnifying power (photomicrographic objective lens). The reasons for this include that the microscope shows a large depth of focus on the specimen side of the objective lens because of a small NA (numerical aperture) value of the objective lens when the lens has a low magnifying power, and an attempt to visually focus on the specimen through the eyepiece can often end up unsuccessfully as the eye adapts itself to the situation to accurately see the object, whereas the microscope shows a small depth of focus on the image side of the objective lens and a slight off-focus condition can become conspicuously recognizable.

Thus, an automatic focusing apparatus for automatically detecting the focal point is considered to be an important accessory for a microscope having a photomicrographic objective lens. Japanese Patent Application Laid-Open No. 61-143710 discloses an automatic focal point detecting apparatus to be used for a microscope that can quickly focus on a specimen having a considerable height.

Meanwhile, the technique of coloring tissues and cells of organisms with fluorescent dye for microscopic observation is known. With this technique, the colored tissues and the cells produce an optical image by rays, but it is impossible to focus on such an optical image produced by infrared rays with a naked eye for the purpose of photographing or displaying on the display screen of an electronic monitor. Therefore, an automatic focal point detecting apparatus is a necessity for such microscopic observation.

Thus, an automatic focal point detecting apparatus to be used for a microscope is typically required to be adapted to visible light and invisible rays such as infrared and/or ultraviolet rays.

However, on the part of such a focal point detecting apparatus, it is accompanied by a problem of chromatic aberration that adversely affects the focusing accuracy of the focal point detecting apparatus, be it for photomicrography or for visual monitoring on an electronic display screen, because of an insufficient color correction capability of the optical system of the apparatus.

FIG. 1 of the accompanying drawings is a graph showing a typical relationship between the wavelength of the optical image and the focal point of a photomicrographic optical system, the vertical and horizontal axes of the graph representing respectively the local point and the wavelength of the optical image of the system. As the graph clearly shows, the focal point can vary remarkably relative to a reference point depending on the chromatic aberration of the optical system.

FIG. 2 of the accompanying drawings is a graph obtained by adding the wavelength vs. focal point curve, or broken curve b, of an automatic focusing (AF) system to the curve a of FIG. 1. The two curves do not agree with each other due to the difference between the optical system of the AF system and that of the photomicrographic system.

The guaranteed focusing range c for both a photomicrographic system and an AF system is defined to be between 460 and 600 nm if the allowable discrepancy between the two focal points is ±1.0 mm. In other words, there is no guarantee of focusing under 460 nm or above 600 nm because the difference of the two focal points exceeds ±1.0 mm. Differently stated, a photograph taken by using such a photomicrographic system and such an AF system can be blurred if the focal point of the latter is not between 460 and 600 nm.

Thus, the combination of an AF system and a photomicrographic system is inevitably subjected to limitations in terms of wavelength for the above described reason because they use different respective optical systems. Therefore, the AF system may not be relied on in wavelength ranges where an off-focus situation occurs due to chromatic aberration.

It is, therefore, the object of the present invention to provide a microscope and a focal point detecting apparatus that operate with a wide wavelength range of an optical image.

SUMMARY OF THE INVENTION

According to a first aspect of the present invention, a focus detection device for a microscope having an image sensor includes a first image-forming optical system for producing an optical specimen image of a specimen onto the image sensor, and a peripheral system having a second image-forming optical system different from the first image-forming optical system. The second image-forming optical system produces another optical specimen image of the specimen in the peripheral system. A focus detection unit is provided for calculating a value indicating an extent of defocusing with respect to an output of the image sensor, and for detecting a focus condition of the first image-forming optical system with respect to the specimen based on the calculated value indicating the extent of defocusing. A cube corner lens unit is inserted in an optical path from said specimen, and has a plurality of selectable cube corner lenses. The cube corner lens unit is optically associated with the first and second image-forming optical systems. In addition, a correction means is provided for determining a correction amount of an optical path length of the first image-forming optical system based on a selected one of the plurality of cube corner lens of the cube corner lens unit, and for correcting the optical path length in accordance with the correction amount so as to prevent an out-of-focus condition in the second image-forming optical system.

According to a second aspect of the present invention, a focus detection device for a microscope having an image sensor again includes a first image-forming optical system for producing an optical specimen image of a specimen onto the image sensor, and a peripheral system having a second image-forming optical system different from the first image-forming optical system. Again, the second image-forming optical system produces another optical specimen image of the specimen in the peripheral system. A focus detection unit is provided for detecting a focus condition of the first image-forming optical system based on a value indicating an extent of defocusing with respect to an output of the image sensor. Again, a cube corner lens unit is inserted in an optical path from said specimen, and has a plurality of selectable cube corner lenses. And the cube corner lens unit is again optically associated with the first and second image-forming optical systems. In addition, an offset determining means is provided for determining an offset amount of an optical path length of the first image-forming optical system based on a selected one of the plurality of cube corner lens of the cube corner lens unit. And still further, a stage drive means is provided for moving the specimen in accordance with the offset amount determined by the offset determining unit so as to prevent an out-of-focus condition in the second image-forming optical system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 10 is a flow chart of the operation of a second embodiment of the invention;

FIG. 11 is a flow chart of the operation of a third embodiment of the invention;

FIG. 12 is a flow chart of the operation of a fourth embodiment of the invention;

FIG. 17 is a schematic cross sectional view of the slider of a sixth embodiment of the invention;

FIGS. 18A and 18B are schematic plan and cross sectional views respectively of an optical path length adjusting means that can be used for the slider of the sixth embodiment;

FIG. 19 is a schematic cross sectional view of the slider of a seventh embodiment of the invention;

FIG. 20 is a schematic cross sectional view of the slider of an eighth embodiment of the invention;

FIGS. 24A through 24D are schematic plan, cross sectional, left lateral and right lateral views respectively of an eleventh embodiment of the invention.

DETAILED DESCRIPTION OF THE INVENTION

1st Embodiment

Figure 3:
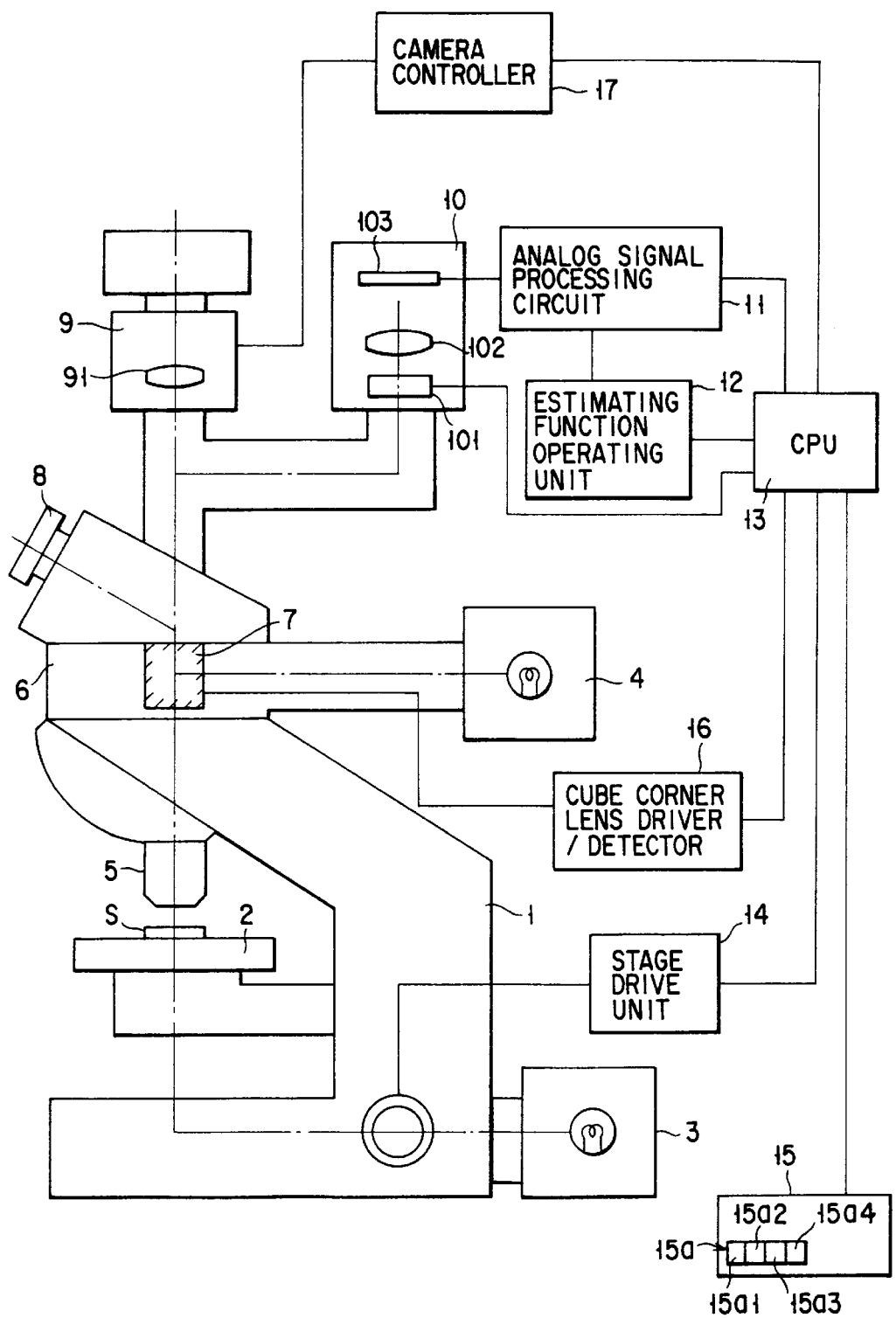
FIG. 3 is a schematic illustration of a first embodiment of the invention.

FIG. 3 illustrates a microscopic focal point detecting apparatus suitably applied to a reflected illumination/transmitting illumination type photomicroscope. Referring to FIG. 3, the microscope main body 1 has a stage 2 for carrying a specimen S for observation, which stage 2 is vertically movable along the optical axis of the microscope. A transillumination light source 3 is arranged below the stage 2 for microscopic observation with transillumination (transmitting illumination), whereas a reflected illumination light source 4 is arranged above the stage 2 for observation with reflected illumination. A mercury lamp or a laser source may be used for each of the light sources 3 and 4. He—Ne laser with a wavelength of 632.8 nm, Ar laser with a wavelength of 488.0 nm, a YAG laser with a wavelength of 1,064.0 nm or a He—Cr laser with a wavelength of 310.0 nm may appropriately be selected for the laser source.

For microscopic observation with transillumination, the flux of light from the transillumination light source 3 is transmitted through the specimen S to form an image by means of the objective lens 5. For observation with reflected illumination on the other hand, the flux of light from the reflected illumination light source 4 is reflected by the specimen S and transmitted through the objective lens 5 to form an enlarged image of the specimen S. The flux of light passing through the objective lens 5 is entered into a cube corner lens unit 7 of a projection tube 6 and the flux of light passing through the cube corner lens unit 7 is led partly to the eyepiece 8 of the microscope and partly to a photographing system 9 and a focal point detector 10.

Figure 4:
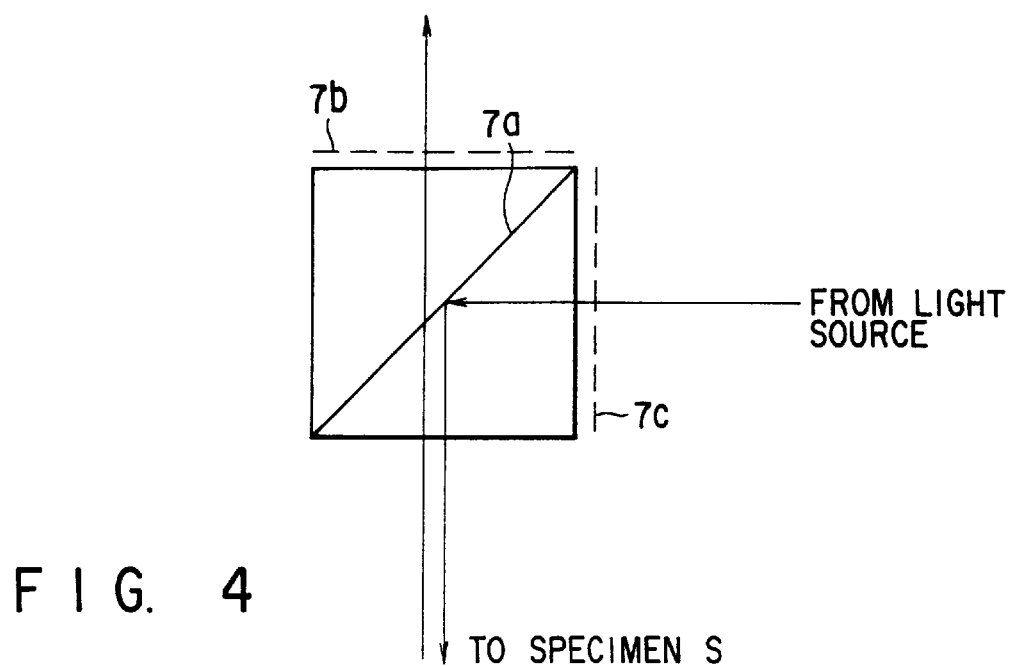
FIG. 4 is a schematic illustration of the principle of a cube corner lens.
Figure 5B:
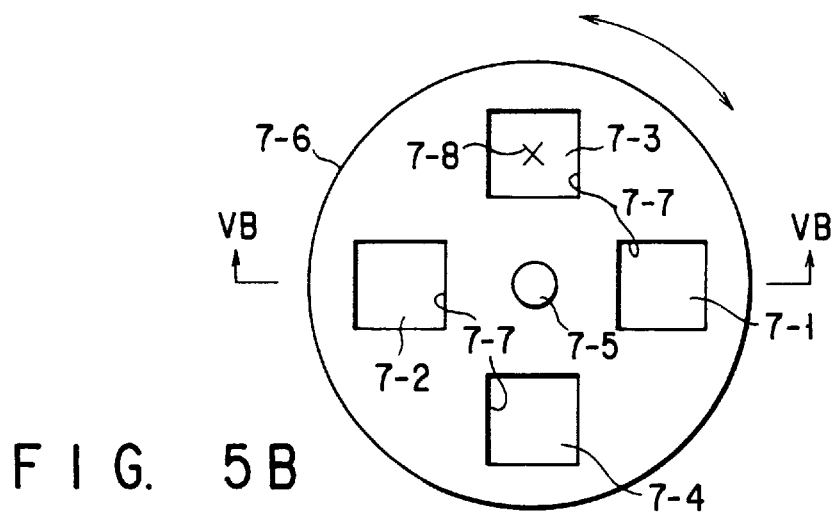
FIGS. 5A and 5B are schematic plan and lateral views respectively of a cube corner selection mechanism.
Figure 5A:
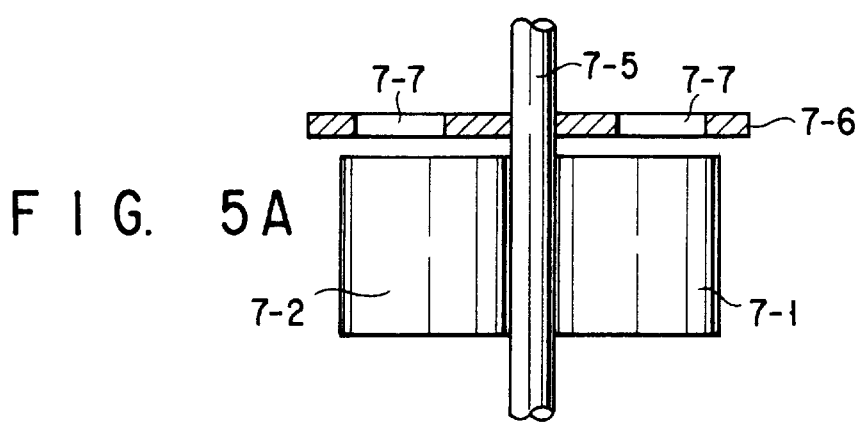

The cube corner lens unit 7 operates as a wavelength selection means and selects a wavelength of the excited light for reflected illumination. FIG. 4 is a schematic illustration of the principle of a cube corner lens and FIGS. 5A and 5B are schematic plan and lateral views respectively of a cube corner lens unit that can be used for the purpose of the invention. As shown in FIG. 4, the cube corner lens unit 7 typically comprises a dichroic mirror 7a, an absorption filter 7b for making the light from the specimen outstanding, an excitation filter 7c for filtering a specific wavelength for the light from the light source which is typically a mercury lamp and exciting the light. FIGS. 5A and 5B schematically illustrate the cube corner lens unit 7 designed to select one of the four cube corner lens 7-1, 7-2, 7-3 and 7-4 for selecting different respective wavelengths. The cube corner lens unit 7 has a disc 7-6 that is fitted to a shaft 7-5 and can be rotated clockwise and counterclockwise. The disc 7-6 is provided with four apertures 7—7 and the four cube corner lens 7-1, 7-2, 7-3 and 7-4 are arranged under the respective apertures 7—7 so that one of the cube corner lens 7-1, 7-2, 7-3 and 7-4 can be aligned with the optical path 7-8 of the unit. The information concerning the selected cube corner lens is transmitted from a cube corner lens driving detector 16 to a CPU 13 and may be displayed on a display.

Any wavelength selection means may be used for the purpose of the invention if it can select a specific wavelength for the light coming from a light source. Means that can be used for the purpose of the invention include a dichroic mirror, an excitation filter, a band-pass filter and other wavelength selection means having a general applicability. A wavelength selection means is not necessary when a laser source that emits beams practically with a single wavelength is used because the laser source is wavelength-selective by itself.

The photographing system 9 comprises an image-forming lens 91 for producing the optical image from the objective lens 5 onto the film surface. The focal point detector 10 comprises a focal point adjusting unit 101, an image-forming lens 102 and an image sensor 103 and produces the optical image from the objective lens 5 onto the image sensor 103 via the image-forming lens 102.

The focal point adjusting unit 101 that operates as a optical path length modifying means positionally adjusts the stage according to the finding of the focal point detector 8 so that the photographing system 9 may catch an focused image of the specimen S as will be described in greater detail hereinafter. The image sensor 103 produces an analog signal corresponding to the voltage that reflects the quantity of light of the projected optical image and the time of accumulation. The image sensor 103 is connected to an analog signal processing circuit 11, which is by turn connected to an estimating function operating unit 12 and also to a CPU 13. The analog signal processing circuit 11 amplifies the analog signal coming from the image sensor 103 and carries out various analog processing operations for the filters. The estimating function operating unit 12 takes in the analog signal processed by the analog signal processing circuit 11, determines by calculation a value indicating the extent of defocusing of the specimen S, using a predetermined estimating function, and transmits a defocusing signal representing the extent of defocusing to the CPU 13.

The CPU 13 carries out the operation of controlling the analog signal from the image sensor 103 so as to make it fit into a given range of the analog signal processing circuit 11. At the same time, it transmits a signal representing the distance and the direction of moving the stage 2 necessary to bring the specimen S into focus as determined by it according to the defocusing signal from the estimating function operating unit 12 to a stage drive unit 14. The stage drive unit 14 vertically moves the stage 2 according to the signal from the CPU 13 representing the distance and the direction of moving the stage 2 until the specimen S comes into focus. The CPU 13 is otherwise connected to an external controller 15, a cube corner lens driver/detector 16 and a camera controller 17 so that it controls the operation of driving the cube corner lens unit and that of controlling the exposure of the specimen S to the photographing system 9 according to the selected cube corner lens selection switch of the external controller 15. Thus, the operation of driving and controlling the cube corner lens unit is carried out by selecting appropriate one of the cube corner lens selection switches 15a (15a1, 15a2, 15a3, 15a4).

Figure 6:
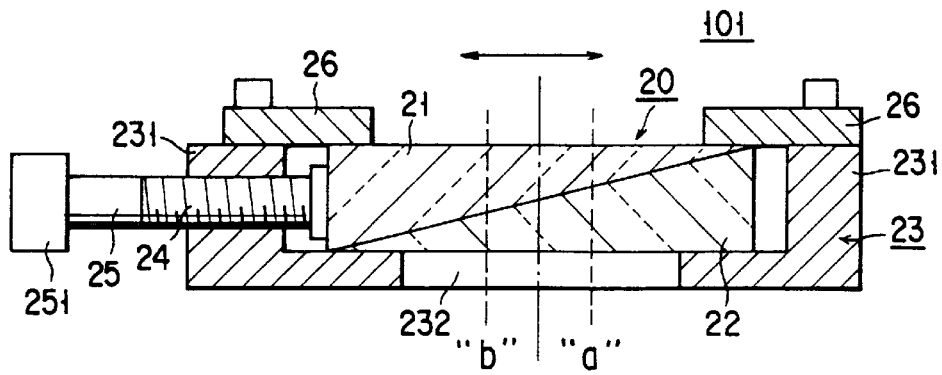
FIG. 6 is a schematic cross sectional view of a focal point adjusting unit that can be used for the first embodiment.

FIG. 6 is a cross sectional view of a focal point adjusting unit 101 that can be used for the first embodiment. Note that any of the focal point adjusting means illustrated in FIGS. 9, 14, 16 and 24A through 24D may be used for the above embodiment in place of the unit 101. The focal point adjusting unit 101 of FIG. 6 comprises a plane-parallel prism 20 realized by laying two wedge-shaped prisms 21 and 22 made of different respective materials one on the other, which plane-parallel prism 20 is housed in a support frame 23 and movable in directions that are parallel relative to the frame as indicated by arrows in FIG. 6. The support frame 23 has a lateral wall 231 and is rigidly connected to a control shaft 25 that is running through the lateral wall 231 with a screw section 24 disposed therebetween. The plane-parallel prism 20 can be moved along the arrows in the support frame 21 by turning the knob 251 of the control shaft 25. An opening 232 is formed through the bottom of the support frame 23 to allow an optical image from the objective lens 5 to pass therethrough. A keep plate 26 is arranged on the lateral wall 232 to keep the plane-parallel prism 20 in position from above.

Thus, if the optical axis of the incident light striking the plane-parallel prism 20 is moved to the position indicated by reference number 351 or 352 by controlling the knob 251, the optical path length of the focal point detector 10 can be modified relative to that of the photographing system 20 on the basis of the ratio of the thickness of the prism 21 to that of the prism 22 until the focal point detector 8 determines that the specimen S is in focus.

The knob 251 of the control shaft 25 may be provided with a scale for indicating the rotary movement of the knob 251 in order to accurately control the movement of the plane-parallel prism 20.

The knob 251 is manually operated by referring to the wavelength of the optical image of the specimen S for controlling the focal point adjusting unit 101. The wavelength of the image of the specimen S can be adjusted by referring to the type of the cube corner lens unit 101 because the former is determined as a function of the latter. If the wavelength is not known, the image is spectroscopically analyzed to begin with and then the wavelength is adjusted by referring to the outcome of the analysis. The adjusting operation can become more easy and reliable if the relationship between the wavelength of the optical image of the specimen S and a given amount of rotation of the knob 251 is determined in advance for the specific photographing system to be used and the wavelength of the optical image is utilized for the scale for the convenience of the operator.

On the other hand, the focal point adjusting unit 101 can be operated in an automatic operation mode by connecting means for driving the knob 251, such as a motor, to it. More specifically, data on the cube corner lens unit and those on the wavelength of the image of the specimen S are entered to the CPU 13 by way of the external controller 15 and the CPU 13 transmits instructions to the drive means on the basis of the entered data. The data to be used for the cube corner lens unit 7 may be those transmitted from the cube corner lens driver/detector 16 to the CPU 13.

Figure 1:
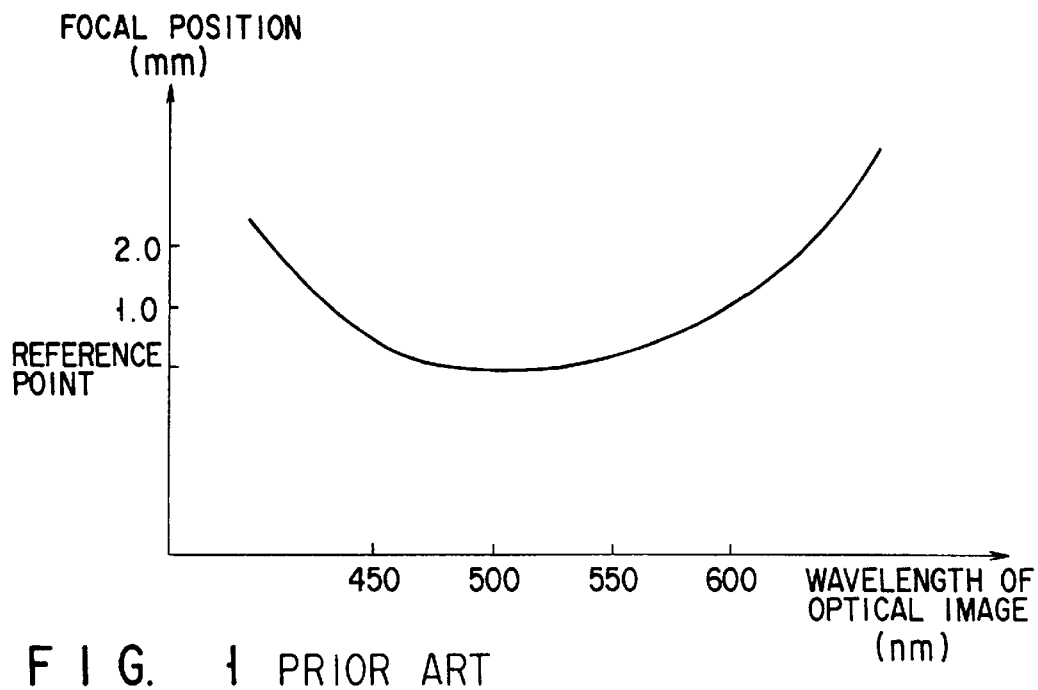
FIG. 1 is a graph showing a typical relationship between the wavelength of the optical image and the focal point of a photomicrographic optical system, the vertical and horizontal axes of the graph representing respectively the local point and the wavelength of the optical image of the system.
Figure 7:
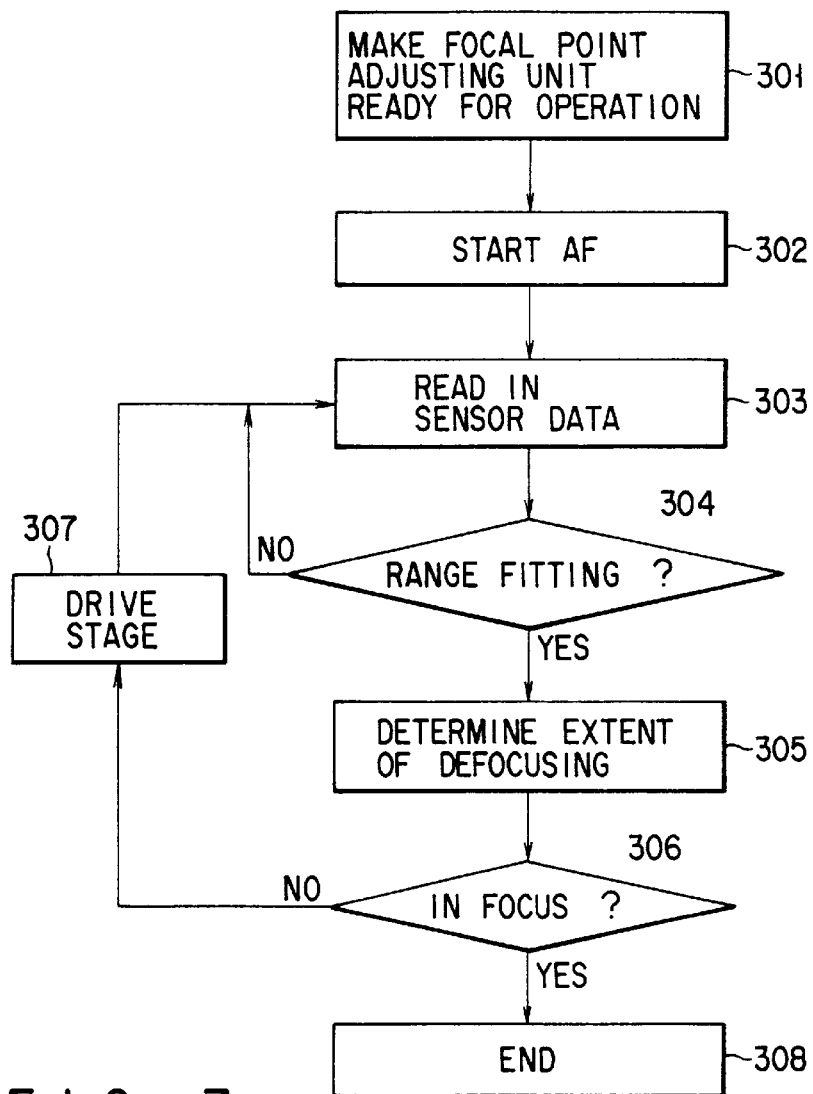
FIG. 7 is a flow chart of the operation of the first embodiment.
Figure 8A:
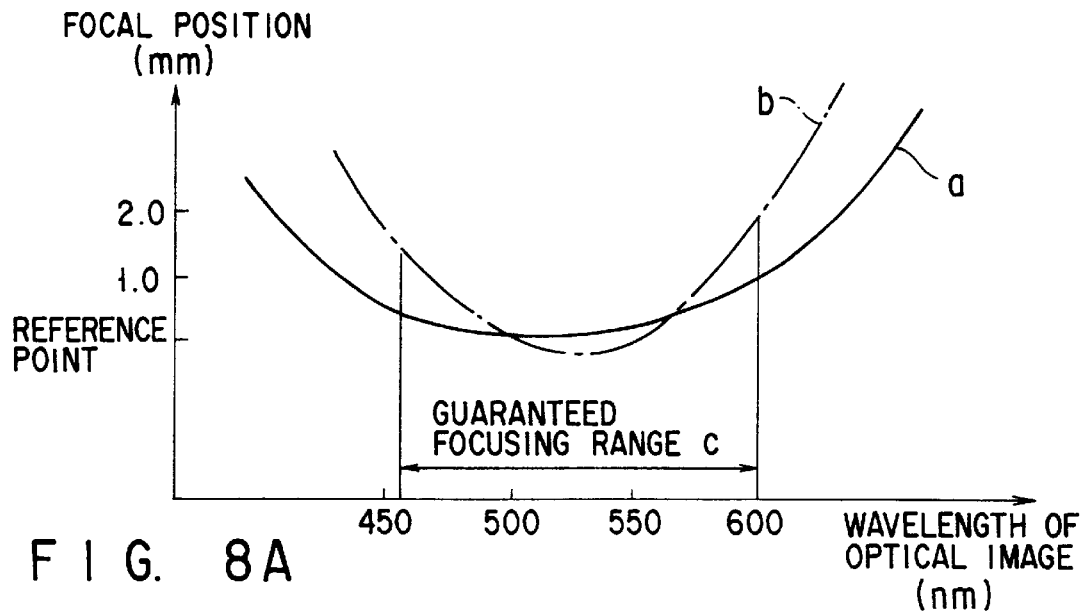
FIGS. 8A and 8B are graphs illustrating a mode of operation of the focal point adjusting unit of the first embodiment.
Figure 8B:
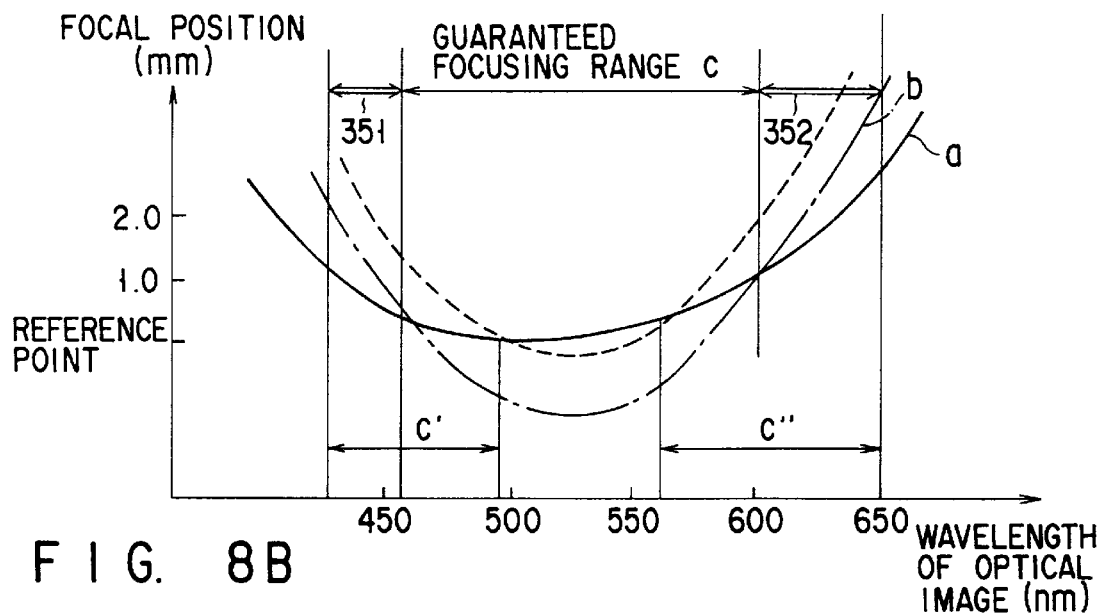

Now, the operation of the first embodiment having a configuration as described above will be described by referring to the flow chart of FIG. 7. Firstly, in Step 301, the observer initializes the focal point adjusting unit 101 on the basis of the wavelength of a known specimen, typically by referring to FIGS. 8A and 8B showing graphs for a mode of operation of the focal point adjusting unit 101 where the optical path length of the AF system is varied by means of the focal point adjusting unit 101. As described earlier by referring to FIG. 1, the vertical axes represent the focal point whereas the horizontal axes represent the wavelength of the specimen. The solid lines in these graphs indicate the focal point of the photograph system relative to the incident wavelength, whereas the broken lines indicate the focal point of the AF systems relative to the incident wavelength. The graph of FIG. 8B is obtained by shifting the focal point curve of the AF system of FIG. 8A along the y-axis by modifying its optical path length. If the allowance for the focal point is 1.0 mm, the guaranteed focusing ranges will be c' and c", which are between 425 and 455 nm as indicated by reference numeral 351 and between 600 and 650 nm as indicated by reference numeral 352 in FIG. 8A. Thus, the observer initializes the focal point adjusting unit 101 for photographing or observing the specimen by referring the AF ranges of 351 and 352.

After initializing the focal point adjusting unit 101, the operator of the microscope starts operating the AF system in Step 302 according to the signal from the external controller 15 and the analog image signal from the image sensor 103 is taken in in Step 302. Then, it is checked in Step 303 if the analog signal from the image sensor 103 matches the effective range of the analog signal processing circuit 11 or not.

If the signal does not match the range, the time of image storing operation of the image sensor 103 is continued until a signal-range matching is obtained. If there is a match, on the other hand, the extent of defocusing is calculated in Step 305, using a predetermined evaluating function and the signal of the image sensor 103. Then, in Step 306, it is determined if an in-focus condition is achieved or not from the calculated extent of defocusing. If it is determined that an in-focus condition is not achieved, the stage is driven in Step 307 as a function of the extent of defocusing and the operation goes back to 303, where the above described operational sequence is repeated until a focused condition is realized in Step 306. Then, the operation proceeds to Step 308, where the control operation is terminated.

Thus, with the above arrangement, at least part of the optical image of the specimen S illuminated either by the transillumination light source 3 or by the incident top illumination light source 4 is projected from the objective lens 5 onto the image sensor 103 by means of a focusing optical system having a coupling lens 102 to produce output signals representing the light intensity distribution of the image of the specimen and operate the given estimating function by means of the analog signal processing circuit 11 and the evaluating function operating unit 12. Thus, the focusing effect of the image-forming optical system on the specimen S is detected by the focal point detector 10 and the photographing system 9 is provided as a peripheral system having an image-forming optical system different from that of the focal point detector 10 so that the optical path length to be determined by the focal point detector 10 relative to the photographing system 9 can be varied by moving the panel-parallel prism 20 of the focal point adjusting unit 101. Therefore, it is possible to correct the off-focus condition of the focal point detector 10 and the photographing system 9 due to an insufficient correction of chromatic aberration in terms of the wavelength of the optical image in order to ensure a high degree of focusing accuracy of the focal point detector 10 relative to the photographing system 9 without relying on the wavelength of the optical image.

Note that, while the above embodiment is designed to initialize the guaranteed focusing range by varying the optical path length by means of the focal point adjusting unit 101, a similar effect can be obtained by using chromatic aberration correcting lens selected as a function of the wavelength.

Figure 9:
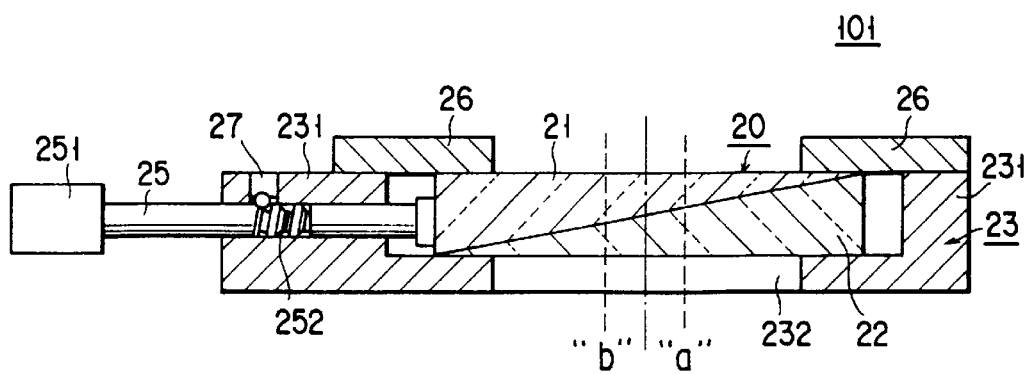
FIG. 9 is a schematic cross sectional view of another focal point adjusting unit that can be used for the first embodiment.

Additionally, while the above embodiment is designed to be regulated by rotating the knob 251 of the plane-parallel-prism 20 of the focal point adjusting unit 101, the knob may alternatively be so designed as to have a depressing/pulling type click mechanism 2 as shown in FIG. 9 and denoted by the same reference numerals of FIG. 6. The control shaft 25 having a knob 251 is provided with a plurality of click grooves 252 and the support frame 21 is provided with a ball plunger 27 to be engaged with the click grooves 252. With such an arrangement, the operation of adjusting the focal point can be further simplified by arranging the click grooves 252 in such a way that they are specifically adapted to wavelengths that are frequently used.

Each of the light sources 3 and 4 of the above embodiment as described earlier has to be so adapted to select the wavelength as a function of the type of the light source. If, for example, a He—Ne laser source having a single wavelength (Red: 632.8 nm, Green: 543.5 nm, Yellow: 594.1 nm, Orange 612.0 nm) is used, the optical path length should be adjusted each time the light source is replaced. If, to the contrary, a Kr—Ar laser source oscillating at a plurality of frequencies (488 nm, 568 nm, 647 nm), the optical path length is adjusted by selecting a frequency by means of a dichroic mirror or an excitation filter and regulating the optical path length according to a chromatic aberration curve produced by modifying the wavelength. In the case of using Kr—Ar laser and a dual band-pass filter allowing the passage of light at both 488 nm and 568 nm, an optimal focused condition can be achieved by determining the optical path length so as to use the middle point of the focal positions according to the chromatic aberration curves of the two wavelengths.

The wavelength filter for transillumination may be regulated stepwise within the wavelength range of 436 nm and 560 nm. Excitation filters that can be used for the above embodiment typically have respective wavelength ranges of 339 nm to 385 nm, 470 nm to 495 nm and 545 nm to 580 nm, whereas absorption filters than can be used for the embodiment typically have respective wavelengths of 420 nm, 515 nm and 610 nm.

2nd Embodiment

Now, a second embodiment of the invention will be described. Since the focal point focus detector of this second embodiment has a configuration basically same as that of the first embodiment described by referring to FIG. 3, it will not be described here any further.

The procedures for determining the guaranteed focusing range of this embodiment will be described by referring to the flow chart of FIG. 10. To begin with, in Step 401, the AF system starts operating as it receives a signal from an external controller 15. Then, in Step 402, an analog image signal from the image sensor 103 is read in and, in Step 403, it is checked if the analog signal from the image sensor 103 matches the effective range of the analog signal processing circuit 11 or not.

If the signal does not match the range, the image storing operation of the image sensor 103 is continued until a signal-range matching is obtained. If there is a match, on the other hand, the extent of defocusing is calculated in Step 404, using a predetermined evaluating function and the signal of the image sensor 103. Then, in Step 405, it is determined if an in-focus condition is achieved or not from the calculated extent of defocusing. If it is determined that an in-focus condition is not achieved, the stage is driven in Step 406 as a function of the extent of defocusing and the operation goes back to Step 402 and the above described operational sequence is repeated until an in-focus condition is achieved.

If, on the other hand, it is determined that an in-focus condition is achieved, the wavelength of the image of the object is obtained from data on the exited cube corner lens unit or directly from the object in Step 407 and the extent of displacement of the focal point is determined from the wavelength of the optical image of the object in Step 408. Then, in Step 409, the stage is driven by the determined extent of offset and the procedures goes to Step 410 to terminate the control operation.

Thus, with this embodiment, an in-focus condition is searched by means of a servo system and on the basis of an in-focus signal so that the stage 2 is forcibly driven according to the extent of offset determined by the wavelength of the optical image of the specimen relative to the vertical direction of the stage 2 that is found in an in-focus condition. Thus, if an off-focus condition is observed with regard to the wavelength of the optical image between the focal point detector 10 and the photographing system 9 that can be given rise to by an insufficient correction of chromatic aberration, it can be corrected by driving the stage 2 further from the state where an in-focus condition is observed by a given extent of offset. Thus, the focal point detector 10 can provide a sufficient degree of in-focus state relative to the photographing system 9 without relying on the wavelength of the optical image and hence the use of a specific unit such as a focal point adjusting unit is not required to further reduce the cost.

3rd Embodiment

While the operation of forcibly driving the stage to compensate an off-focus state due to a wavelength discrepancy after the operation of bringing into an in-focus state in each of the above embodiments, it can be omitted to achieve the objective if the operation of bringing into an in-focus condition is treated as an element of the estimating function. As shown in FIG. 11, the AF system is started in Step 501 and data on the cube corner lens unit are obtained from the cube corner lens driver/detector 16 or the external controller 15 in Step 502. Then, the optical path length is calculated from the data on the cube corner lens unit (Step 503) and an operation of bringing into focus is carried out by driving the stage if an off-focus state is detected (Steps 504 through 506).

According to the invention, chromatic aberration can be corrected during the operation of detecting an in-focus condition. As shown in FIG. 12, the AF system is started in Step 511 and data on the selected cube corner lens unit are obtained from the cube corner lens driver/detector 16 or the external controller 15 in Step 502. Then, the in-focus position α and the chromatic aberration correcting value β is calculated in Step 513. Then, the current position Z of the stage is located in Step 516 and an in-focus state is existent or not is determined by equation Z−(α+β)=0 so that the stage is driven to operate when a no in-focus state is existent (Steps 517 and 518).

While the invention is described above by referring to embodiments, the following ideas are also included within the scope of the invention. Firstly, the optical path length or the extent of correction of chromatic aberration of the focal point detector relative to the peripheral system of the excited cube corner lens or the filter is determined on the basis of the data of the illumination system for illuminating the specimen. With such an arrangement, the off-focus state of focal point detecting means and the peripheral system with regard to the wavelength of the optical image given rise to by an insufficient correction of chromatic aberration can be corrected automatically from the data on the illumination system.

While the focusing operation of the above embodiments is carried out by driving the stage, a similar effect can be obtained by driving the cube corner lens unit.

Thus, according to the invention, the wavelength range of the optical image for guaranteeing the focusing accuracy of the focal point detector relative to a peripheral system such as the photographing system can be remarkably expanded to realize a focal point detecting operation with an enhanced level of accuracy.

Now, the present invention will be described by referring to embodiments of focal point adjusting unit that are different from the above embodiments comprising a focal point adjusting unit as means for modifying the optical path length as described above by referring to FIGS. 4 and 7.

4th Embodiment

Figure 13:
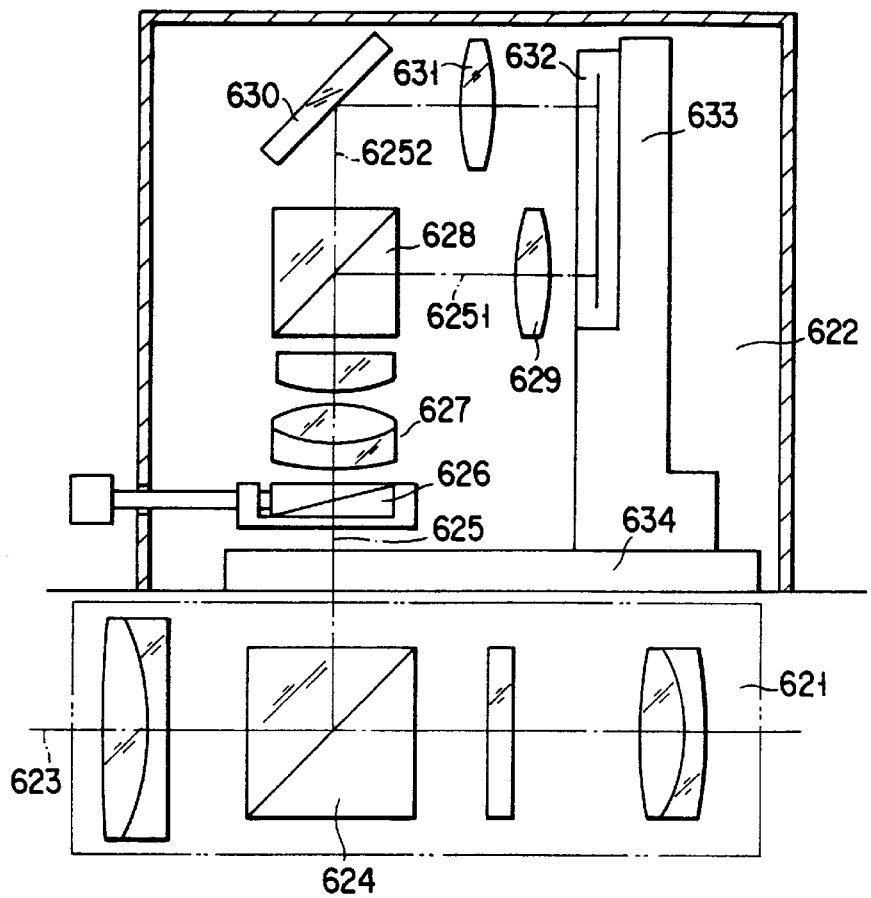
FIG. 13 is a schematic illustration of the AF system of a fourth embodiment of the invention.

FIG. 13 is a schematic illustration of an AF unit that can be used for the purpose of the invention. In FIG. 13, there are shown an optical system 621 and an AF unit 622, of which the optical system 621 has a focusing panel and a beam splitter 624 for leading beams from the objective lens (not shown) to the AF unit 622.

The AF unit 622 comprises a plane-parallel panel 626, a relay lens system 627 and a beam splitter 628 arranged along the optical path 625 led from the optical system 621. A relay lens 629 is arranged along optical path 6251 of the two optical paths divided by the beam splitter 628 that is reflected by 90° and a reflector 630 and a relay lens 631 are arranged along the straight optical path 6252 and the two beams from the relay lens 629 and 631 having a difference in the optical path length are fed to a line sensor 632. The line sensor 632 is rigidly held to a line sensor anchoring block 633, which anchoring block 633 is supported by a base 634. A control circuit substrate (not shown) is arranged on the base 634.

Thus, the beam led into the AF unit by the beam splitter 624 of the optical system 621 is then fed to the beam splitter 628 along the optical path 625 and by way of the plane-parallel panel 626 and the relay lens system 627 and divided into two beams, of which the one reflected by 90° is fed to the line sensor 632 along the optical path 6251 and by way of the relay lens 629, whereas the straight beam moves along the optical path 6252 and is reflected by the reflector 630 to turn its course by 90° before it is fed to a different location of the line sensor 632 by way of the relay lens 631.

Figure 14:
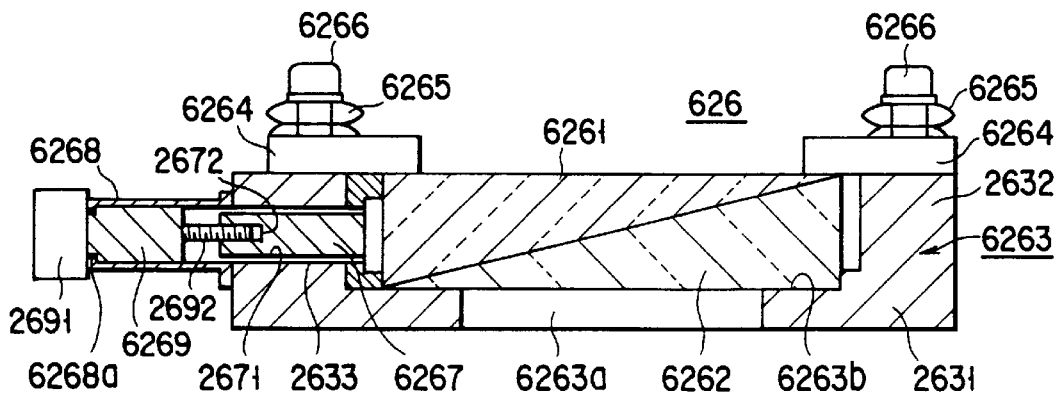
FIG. 14 is a schematic cross sectional view of a plane-parallel plate that can be used for the fourth embodiment.

FIG. 14 is a schematic illustration of the plane-parallel panel 626 inserted into the optical path 625. The plane-parallel panel 626 has parallel surface planes by laying a pair of wedge-shaped prisms 6261 and 6262 one on the other and the height of the panel can be modified by sliding the prisms relative to each other along the boundary. The plane-parallel panel 626 is supported by a support frame 6263. The support frame 6263 has an elevated peripheral wall 2632, a bottom aperture section 6263a for allowing the beam from the beam splitter 624 to pass therethrough and a grooved bottom 6263b arranged around the aperture section 6263a for receiving the lower wedge-shaped prism 6262 of the plane-parallel panel 626. A pair of keep plates 6264 are rigidly fitted to the top of the elevated wall 2632 by means of screw members 6266 with respective disc springs disposed therebetween so that the upper wedge-shaped prism 6261 of the plane-parallel panel 626 is urged downward by the keep plates 6264 under the driving effect of the screw members 6266 and the springs 6265. With this arrangement, the plane-parallel state of the wedge-shaped prisms is maintained to minimize the adverse effect on the AF unit if the upper prism 6261 is displaced laterally.

The elevated wall 2632 of the support frame 6263 is additionally provided with a horizontal hole 2633 and a control shaft 6267 runs through the hole 2633 with the internal end rigidly fitted to the larger lateral side of the upper wedge-shaped prism. The control shaft 6267 is axially movable by means of a guide member 2671 arranged between the shaft and the hole 2633. The external end of the control shaft 6267 is provided with a threaded hole 2672.

The elevated lateral wall 2632 is additionally provided with a guide sleeve 6268 communicating with the hole 2633 and a control rod 6269 having a knob 2691 is made to run through the guide sleeve 6268. While the control rod 6269 is rotatable relative to the guide sleeve 6268, its axial displacement is blocked by a collar 6268a arranged on the guide sleeve 6268. A screw 2692 is arranged at the front end of the control rod 6269 so that, as the screw 2692 is driven into the threaded hole 2672 of the control shaft 6267, the control shaft 6267 can be driven back and forth along the guide 2671 to horizontally move the upper wedge-shaped prism 6261 of the plane-parallel panel 626 by rotating the knob 2691 and hence the screw 2692 at the front end of the control rod 6269.

With the above arrangement, the height of the plane-parallel panel 626 can be modified as a function of the rotation6ion of the knob 2691, while keeping the plane-parallel state of the upper and lower surfaces of the plane-parallel panel 626.

With the AF unit having a configuration as described above, the beam fed to the AF unit 622 by the beam splitter 624 of the optical system 621 is made to pass through the plane-parallel panel 626 and the relay lens system 627 and then divided into two beams by the beam splitter 628, one of which is turned by 90° and fed to the line sensor 632 by way of the relay lens 629 while the other moves straight and reflected by 90° by the reflector 630 and enters the line sensor 632 by way of the relay lens 631. Thus, the two beams having a difference in the optical path length are received by the line sensor 632 and the respective signals are fed to a control circuit substrate (not shown) to detect the focused position by means of a contrast detection method. At the same time, a signal for controlling the direction and the distance of driving the stage is generated and fed to the stage drive circuit of the microscope man body to move the stage to the in-focus state.

Assume that the plane-parallel panel 626 arranged in the AF unit 622 is initialized in terms of the height. Then, the operator can manually control the AF unit by way of the knob 2691 of the plane-parallel panel 626 to bring the specimen into in-focus state.

Then, the control rod 6269 is rotated with the screw section 2692 to linearly drive the control shaft 6267 having the threaded hole 2672 along the guide 2671 to horizontally move the upper wedge-shaped prism 6261 of the plane-parallel panel 626 until the latter shows a right height.

The height of the plane-parallel panel 626 is regulated in this way to vary the reduced optical path of glass and that of air to consequently correct the in-focus position on the line sensor 632 so that the object of observation can be brought into in-focus state.

The AF unit may not operate in an intended manner to bring the specimen into focus when the latter is an organism and has a height greater than the depth of focus of the selected objective lens. With the above embodiment, however, the AF unit can be finely regulated to bring the point of observation into focus by means of the knob 2691 of the plane-parallel panel 626, while the observer is seeing the specimen.

The object of microscopic observation may have an undulated profile (particularly along the optical axis) so that, if the highest point of the specimen is brought into focus, the other portions of the specimen move out of focus particularly when the objective lens of the microscope has a small depth of focus. If such is the case, the AF unit can be finely regulated to bring the point of observation into focus upwardly or downwardly by means of the knob 2691 of the plane-parallel panel 626. Since the plane-parallel panel 626 for shifting the focused position is arranged in the AF unit 622 to which a beam from the beam splitter 624 of the optical system 621 is fed, the optical path length of the optical system is not subject to change if the focused position of the AF unit is shifted.

Thus, with the above arrangement of vertically laying wedge-shaped prisms 6261 and 6262 to form a plane-parallel panel 626, which is inserted in the optical path 625 of the AF unit, the focused position can be finely shifted from the automatically focused position by moving the upper wedge-shaped prism 6261 relative to the lower wedge-shaped prism 6262 and changing the effective height of the plane-parallel panel 626 and also by utilizing the difference in the optical path length between air and glass.

Therefore, the observer of the microscope can finely regulate the focused position of the AF unit by hand so that he or she can correctly bring the object of observation into focus if the object is beyond the adaptability of the AF unit to consequently improve the efficiency of microscopic observation. Additionally, since the focused position can be finely regulated by hand, the initial focusing operation does not have to meet rigorous requirements to consequently reduce the workload for initializing the observation and hence the cost of microscopic quality control.

5th Embodiment

Figure 15:
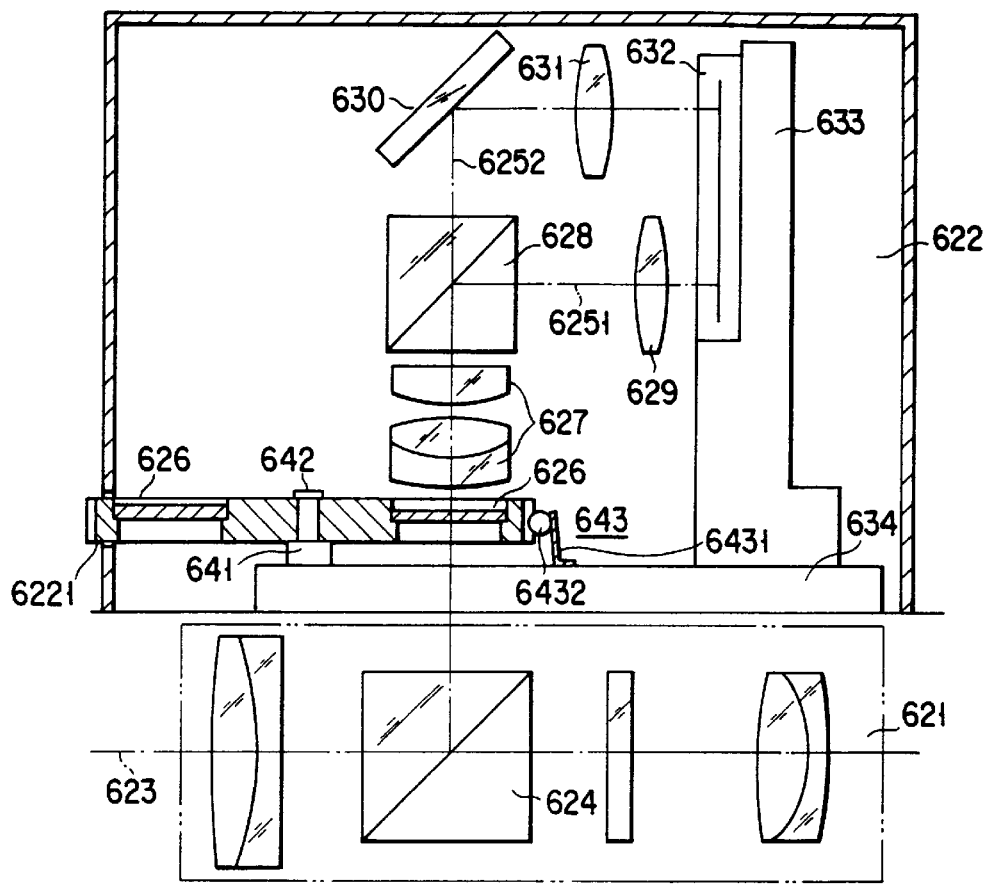
FIG. 15 is a schematic illustration of a sixth embodiment of the invention.
Figure 16:
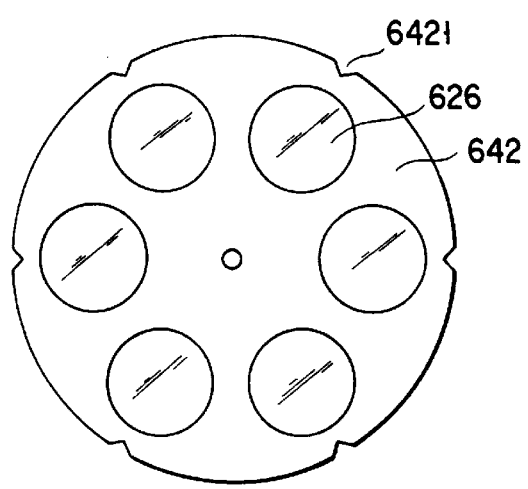
FIG. 16 is a schematic plan view of a turret that can be used for the fifth embodiment of the invention.

FIG. 15 is a schematic illustration of a fifth embodiment of the invention. In FIG. 15, the components similar to their counterparts of the embodiment of FIG. 13 are denoted by the same reference numerals. In this embodiment, a rotary shaft 641 is arranged on the base 634 of the AF unit 622 and rotatably carries a turret 642. The turret 642 can hold a number of different plane-parallel panels 626, which can selectively be used by rotating the turret 642. More specifically, a total of six plane-parallel panels 626 having different heights are arranged equiangularly around the center of the turret 642, which have notches 6421 corresponding to the respective plane-parallel panels 626 so that one of the plane-parallel panels 626 can be held in position on the optical path 6252 of the AF optical system as the corresponding notch 6421 is engaged with a click mechanism 643 having a spring 6431 and a ball 6432. Additionally, the peripheral area of the turret 642 is partly exposed through a slot 6221 of the AF unit 622 so that the turret 642 may be manually rotated from outside by means of the exposed portion and the notch 6421 to select one of the plane-parallel panels 626 and put it in position on the optical path 6252 of the AF optical system.

Thus, with this embodiment, the observer can shift the focused position of the AF unit by rotating the turret 642 and putting the desired one of the plane-parallel panels 626 in position on the optical path 6252 of the AF optical system. Therefore, the observer can bring the right plane-parallel panel in position with a single stroke of action if he or she knows the focused-position of each of the plane-parallel panels 626 on the turret 642. The turret 642 may be so arranged as to be electrically driven to rotate by a motor and controlled remotely by means of a control box.

6th Embodiment

FIG. 17 is a schematic illustration of a sixth embodiment of the invention. In FIG. 17, the components similar to their counterparts of the embodiment of FIG. 15 are denoted by the same reference numerals. In this embodiment, the turret 642 of FIG. 15 is replaced by a slider 651 having a plurality of apertures 6511 (three in FIG. 171) for holding respective plane-parallel panels 626 having different heights. The slider 651 is pushed into the AF unit 622 through a slot 6221 of the AF unit as shown in FIG. 15 along a guide (not shown). The slider 651 is provided with click notches for the corresponding plane-parallel panels 626 so that the AF unit 621 is held in position on the optical path of the AF optical system each time one of the notches comes into engagement with a click mechanism as it is pushed into the slot 6211 of the AF unit 621.

With the above arrangement, the observer can manually modify the focused position of the AF unit to bring forth effects similar to those of the fifth embodiment with reduced cost and space requirement in the AF unit 621 as compared with the use of a turret.

FIGS. 18A and 18B illustrate optical path length modifying means using a slider 651 as shown in FIG. 17. A slider 651 is horizontally movably housed in a space defined by a pair of oppositely arranged lateral support panels 651*a* and 651*b* and oppositely disposed upper and lower guide panels 651*c* and 651*d*. The slider 651 is provided with pairs of click notches 651*e* at positions corresponding to the respective plane-parallel panels 626. On the other hand, the lateral support panel, or the guide panel, 651*a* is provided with a click aperture 651*e* housing therein a click mechanism comprising a grub screw 651*g*, a coil spring 651*h* and a ball 651*i*, which ball 651*i* is urged by the coil spring to partly move into the click notch 651*e* to hold the slider 651. Reference symbol 651*j* in FIGS. 18A and 18B denote a cover of the AF unit 622.

With the above arrangement, the observer can manually and accurately place a desired plane-parallel panel 626 on the optical path of the AF optical system by axially moving the slider 651 as the click mechanism holds the plane-parallel panel 626 accurately in position.

7th Embodiment

FIG. 19 is a schematic illustration of the slider of a seventh embodiment of the invention. Otherwise, this embodiment is similar to the above described sixth embodiment. The slider 661 is made of transparent resin and has a stepped upper surface to show different heights corresponding to respective plane-parallel panels 626 held by the slider. As in the case of its counterpart of the sixth embodiment, the slider 661 is led into the AF unit 622 through a slot 6221 along a guide (not shown). The slider 661 is provided with slick notches corresponding to respective plane-parallel panels 626 so that one of the plane-parallel panels 626 of the slider 661 is held in position on the optical path of the AF optical system by the engaging effect of the click mechanism and a corresponding one of the click notches.

With the above arrangement, the observer can manually and accurately place a desired plane-parallel panel 626 on the optical path of the AF optical system by axially moving the slider 651 as the click mechanism holds the plane-parallel panel 626 accurately in position. Additionally, since the slider is made of transparent resin that can be molded in one piece, the entire cost of such an AF unit can be further reduced.

8th Embodiment

FIG. 20 is a schematic illustration of the slider of an eighth embodiment of the invention. Otherwise, this embodiment is similar to the above described sixth embodiment. The slider 671 has only one aperture 6711 for engagedly receiving a filter frame 672 at the front end thereof. The filter frame 672 has a plane-parallel panel 626. A number of spare filter frames 672 with respective plane-parallel panels 626 having different heights are provided so that any selected one of them may be used to replaced one in position in the slider 671.

As in the case of its counterpart of the sixth embodiment, the slider 671 holding a desired plane-parallel panel 626 in the front end aperture 6711 is led into the AF unit 621 through a slot 6221 along a guide (not shown).

Thus, the observer can select a proper one of the filter frames 672 for the slider 671 to operate the AF unit for focusing.

This embodiment of slider is advantageous relative to the preceding sliders because it is less bulky and less costly. Additionally, since spare filter frames 672 carrying respective plane-parallel panels 626 with different heights can be prepared practically without limitation, the focusing operation can be conducted steplessly.

9th Embodiment

Figure 21A:
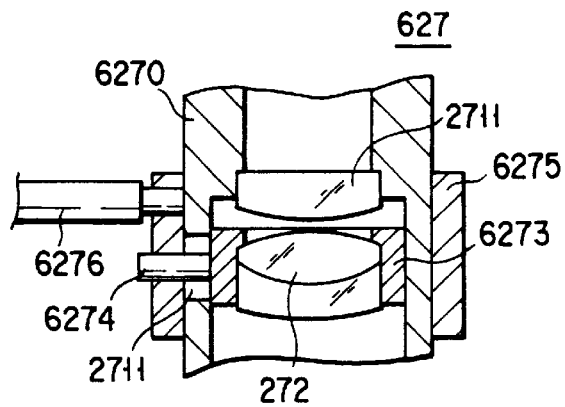
FIGS. 21A and 21B are schematic cross sectional and lateral views respectively of a ninth embodiment of the invention.
Figure 21B:
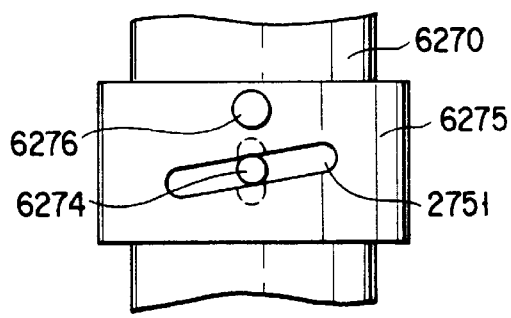

FIGS. 21A and 21B are schematic illustrations of the relay optical system 627 of the AF unit 621 of the ninth embodiment of the invention, which is obtained by modifying its counterpart of the fourth embodiment so as to make the focused position regulatable. Otherwise, this embodiment is similar to the fourth embodiment. The relay optical system 627 comprises a first lens group 6271 and a second lens group 6272 arranged in a lens tube 6270 along the optical axis of the optical system. The first lens group 6271 is rigidly fitted to the inside of the lens tube 6270, whereas the second lens group 6272 is arranged in a movable lens frame 6273 telescopically movable in the lens tube 6270 along the optical axis so that the focal point of the AF optical system is modified by moving the movable lens frame 6273 and the second lens group 6272 along the optical axis.

The movable lens frame 6273 is provided with a pin 6274 projecting outward through a pin receiving slot 2711 of the lens tube 6270. The slot 2711 of the lens tube 6270 extends along the optical axis of the lens system.

A cam tube 6275 is rotatably arranged around the lens tube 6270 and provided on the outer peripheral surface thereof with an oblique slot 2751 inclined relative to the optical axis by a predetermined angle. The angle of inclination of the slot 2751 is determined as a function of the distance by which the second lens group 6271 is moved along the optical axis and the angle of rotation of the cam tube 6275 when it is operated.

When the pin 6274 of the movable lens frame 6273 is held in engagement with the slot 2751 of the cam tube 6275, the pin 6274 and hence the movable lens frame 6273 can be axially moved in the slot 2751 and hence along the optical axis of the lens by rotating the cam tube 6275.

A lever 6276 is screwed into an upper position of the outer peripheral surface of the cam tube 6275 in order to make the cam tube 6275 easily rotatable. The lever 6276 passes through the peripheral wall of the cam tube 6275 and its inner end gets to the outer peripheral surface of the lens tube 6270 so that the cam tube 6275 and the lens tube 6270 can be firmly secured relative to each other by driving the lever inwardly.

The free end of the lever 6276 projects externally to the outside of the AF unit 621 so that the lever 6276 can be manually operated from the outside of the AF unit 621.

Thus, the cam tube 6275 can be rotated by the operator by means of the lever 6276 to drive the pin 6274 axially in the slot 2751 of the cam tube 6275 and hence the movable lens frame 6273 in the lens tube 6270 along the optical axis. As the second lens group 6272 of the movable lens frame 6273 is moved along the optical axis, the distance between it and the first lens group 6271 is modified to shift the focal point of the optical lens system. As the focal point is defined, the lever 6276 is driven in to firmly secure the cam tube 6275 and the lens tube 6270 relative to each other.

Thus, the focal point of the AF unit can be made to move by a desired distance that is determined as a function of the angle of inclination of the slot 2751 of the cam tube 6275 and the distance of movement of the lever. In other words, the focal point of the AF unit can be regulated steplessly. Since the movable lens frame 6273 is moved telescopically in the lens tube 6270, no axial displacement of the AF optical system can take place.

10th Embodiment

Figure 22:
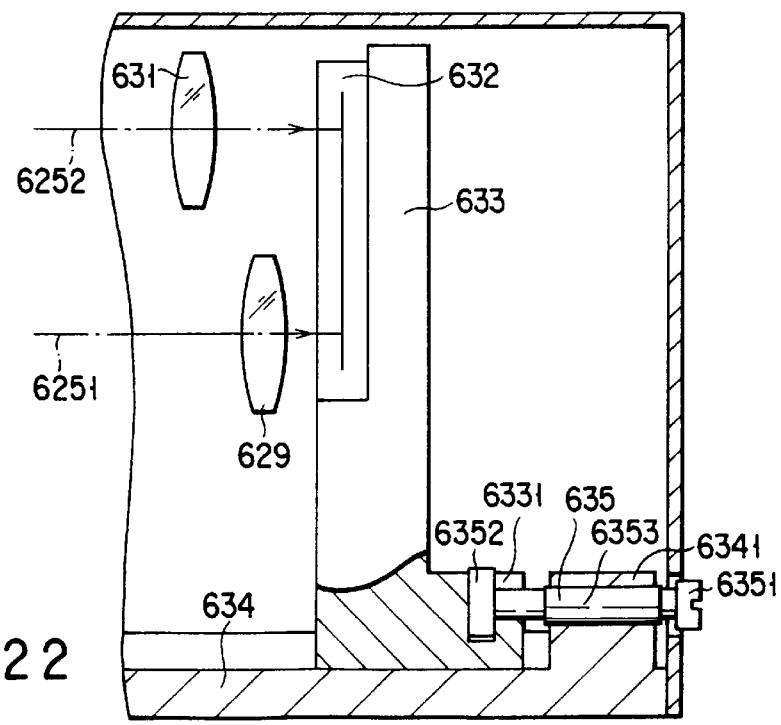
FIG. 22 is a schematic cross sectional view of the tenth embodiment of the invention.

FIG. 22 is a schematic illustration of the line sensor anchoring block 633 and the base 634 of a tenth embodiment of the invention so arranged as to make the focal point of the AF unit regulatable by modifying the arrangement of the fourth embodiment. Otherwise, this embodiment is similar to the fourth embodiment. The line sensor 632 of the AF unit 632 is rigidly secured to the line sensor anchoring block 633, which is supported by the base 634. The bottom of the anchoring block 633 is dovetailed (not shown) and received in a dovetail groove (not shown) of the base 634 so that the anchoring block 633 may be moved linearly and smoothly.

The base 634 is additionally provided with an elevated wall 6341 standing vis-a-vis the anchoring block 633 and equipped with a control rod 635 having a threaded section 6353.

Figure 23:
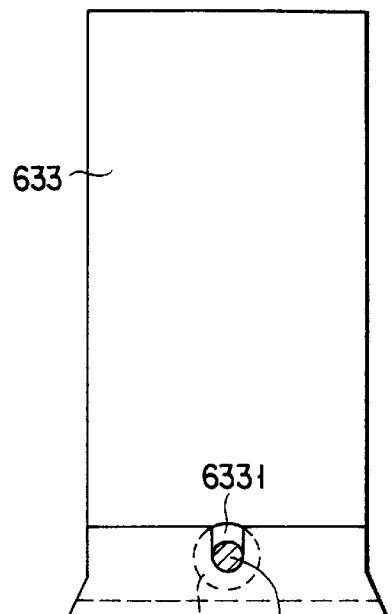
FIG. 23 is a schematic lateral view of the fixed block of the tenth embodiment of the invention.

The control rod 635 has a head 6351 at the free end thereof, which head 6351 is provided at the top thereof with a screw slot so that the control rod 635 may be driven to move linearly by rotating it from the outside of the AF unit 622 typically by means of a screw driver. The control rod 635 is provided with a collar 6352 at the inner end thereof, which collar 6352 is held in engagement with a hollow section 6331 of the anchoring block 633. As shown in FIG. 23, the hollow section 6331 has a width for tightly receiving the control rod 635 and a depth for tightly receiving the collar 6352 of the control rod 635.

Thus, with the above arrangement, the line sensor 632 is moved along the optical axis of the AF unit 622 with the anchoring block 633 by way of the collar 6352 of the control rod 635 as the head 6351 of the control rod 635 is rotated from the outside of the AF unit 622 typically by means of a screw driver to linearly move the control rod 635 under the effect of the threaded section 6353. Since the anchoring block 633 is moved along the dovetail groove of the base 634 arranged along the optical axis for firmly receiving the dovetailed bottom of anchoring block 633, the optical axis of the AF optical system is not displaced by the above operation. The dovetailed guide of the anchoring block 633 may be replaced by a translation guide.

11th Embodiment

FIGS. 24A through 24D illustrate the plane-parallel panel of an eleventh embodiment of the invention.

Referring to FIGS. 24A through 24D, a pair of wedge-shaped prisms 681 and 682 have identical profile and are arranged with a given gap disposed therebetween. One of the prisms, or the prism 682 is fitted to a frame main body 683, which frame main body 683 has a recess 6831 for holding the wedge-shaped prism 682 in a positionally parallel relationship and a dovetail grove 6832 for receiving a corresponding dovetail. An elliptic aperture 6833 is formed through the bottom of the recess 6831 for allowing a flux of light to pass therethrough.

The dovetail groove 6832 of the frame main body 683 tightly receives a dovetail 684 to slidingly move the latter along the groove 6832. The dovetail 684 is also provided with a recess for receiving holding the other wedge-shaped prism 681 in a positionally parallel relationship. An elliptic aperture 6842 is formed though the bottom of the recess 6841 for allowing a flux of light pass therethrough.

The dovetail 684 is received in the dovetail groove 6832 and pressed inwardly and downwardly by bearings 685 and the front end of a rotary shaft 6862 connected to a control knob 686 is rotatably arranged between the bearings 685. The rotary shaft 6862 is provided on a midway thereof with an externally threaded section 6861 for engagement with an internally threaded section 6834 of the frame main body 683 so that the externally threaded section 6861 which is engaged with the internally threaded section 6834 is driven in or out as the control knob 686 is rotated clockwise or counterclockwise by the operator. Consequently, the dovetail 684 that is freely rotatable relative to the bearings 685 but axially movable with rotary shaft 6862 is moved along the major axis of the elliptic slot 6833, or along the axial direction of the externally threaded section 6861. The movement of the dovetail 684 is limited by a stopper 687 screwed into the frame main body 683.

Figure 2:
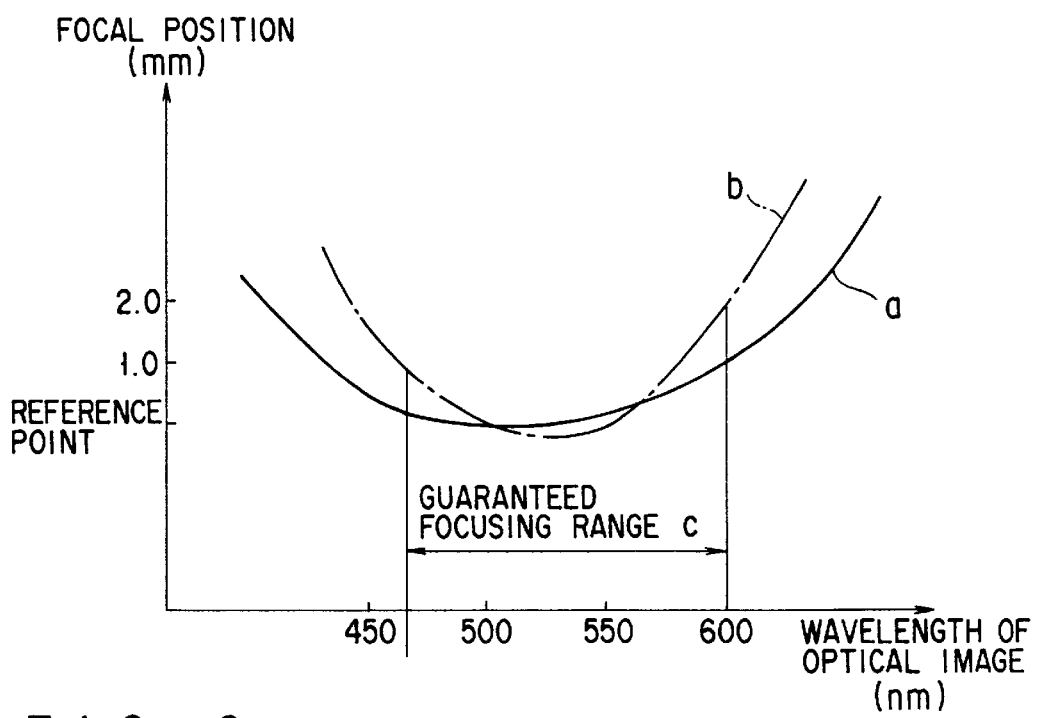
FIG. 2 is a graph obtained by adding the wavelength vs. focal point curve relationship of an automatic focusing (AF) system to the curve of FIG. 1.

Thus, the wedge-shaped prism 681 held by the dovetail 684 is moved as the dovetail 684 is driven from the illustrated position by rotating the control knob 686. Note that the bottom of the recess 6841 of the dovetail 684 holding the wedge-shaped prism 681 and the bottom of the recess 6831 of the frame main body 683 holding the other wedge-shaped prism 682 are held in parallel with each other and also with the moving direction of the dovetail 684. Therefore, the plane-parallel panel constituted by the two wedge-shaped prisms 681 and 682 simply changes its height to bring forth the effect described earlier by referring to FIG. 2.

Particularly, since the sloped surfaces of the two wedge-shaped prisms 681 and 682 are not in contact with each other in this embodiment, their plane-parallel relationship is not damaged by moving the dovetail 684 to adversely affect the optical axis of the flux of light passing therethrough so long as the recesses 6831 and 6841 are accurately machined so that the embodiment will operate with high precision and show a prolonged service life. The operation of the sliding parts of the embodiment can be regulated in terms of the force to be applied thereto for sliding motion by regulating the engagement of the dovetail and the dovetail groove.

The bearings 685 may be omitted for coupling the rotary shaft 6862 connected to the control knob 686 and the dovetail 684 so long as there is provided an arrangement for limiting the axial movement of the rotary shaft 6862. The drive mechanism of driving the wedge-shaped prisms 681 and 682 may be switched from the described dovetail ar arrangement to a commercially available translation guide or some other translation mechanism utilizing rollers or balls.

As described in detail above, according to the invention, the focal point of the AF unit may be finely regulated stepwise or steplessly to shift it to a desired position so that the object of microscopic observation can be brought into focus by appropriately controlling the AF unit.

Additionally, since the focal point is finely regulatable, the AF unit is not required to show an enhanced level of precision for its focal point regulating operation to make the unit easy for manufacturing at reduced cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A focus detection device for a microscope having an image sensor, the focus detection device comprising:
   a first image-forming optical system for producing an optical specimen image of a specimen onto said image sensor;
   a focus detection unit for calculating a value indicating an extent of defocusing with respect to an output of said image sensor, and for detecting a focus condition of said first image-forming optical system with respect to said specimen based on the calculated value indicating the extent of defocusing;
   a peripheral system having a second image-forming optical system different from said first image-forming optical system, said second image-forming optical system producing another optical specimen image of said specimen in the peripheral system;
   a cube corner lens unit inserted in an optical path from said specimen, said cube corner lens unit having a plurality of selectable cube corner lenses and being optically associated with said first and second image-forming optical systems; and
   correction means for determining a correction amount of an optical path length of said first image-forming optical system based on a selected one of the plurality of cube corner lenses of the cube corner lens unit, and for correcting the optical path length in accordance with the correction amount so as to prevent an out-of-focus condition in said second image-forming optical system.

2. A focus detection device for a microscope according to claim 1, wherein said correction means includes a parallel-plane panel section.

3. A focus detection device for a microscope according to claim 2, wherein said parallel-plane panel section comprises a plurality of parallel-plane panels each having a different thickness.

4. A focus detection device for a microscope according to claim 2, wherein said parallel-plane panel section comprises a pair of wedge-shaped prisms which have an identical profile and which are arranged with a gap disposed therebetween.

5. A focus detection device for a microscope according to claim 1, wherein said correction means includes a rotatable part of an element which comprises said first image-forming optical system.

6. A focus detection device for a microscope according to claim 1, wherein said cube corner lens unit comprises means for guiding a light from a light source to said specimen, and means for guiding the light from said specimen to said first and second image-forming optical systems.

7. A focus detection unit for a microscope according to claim 1, wherein said peripheral system comprises a photographing system.

8. A focus detection device for a microscope having an image sensor, the focus detection device comprising:
   a light source for illuminating a specimen;
   a first image-forming optical system for producing an optical specimen image of a specimen onto said image sensor;
   a focus detection unit for detecting a focus condition of said first image-forming optical system based on a value indicating an extent of defocusing with respect to an output of said image sensor;
   a peripheral system having a second image-forming optical system different from said first image-forming optical system, said second image-forming optical system producing another optical specimen image of said specimen in the peripheral system;
   a cube corner lens unit inserted in an optical path from said specimen, said cube corner lens unit having a plurality of selectable cube corner lenses and being optically associated with said first and second image-forming optical systems;
   offset determining means for determining an offset amount of an optical path length of said first image-forming optical system based on a selected one of the plurality of cube corner lenses of the cube corner lens unit; and
   stage drive means for moving said specimen in accordance with the offset amount determined by said offset determining means so as to prevent an out-of-focus condition in said second image-forming optical system.

9. A focus detection device for a microscope according to claim 8, wherein said offset determining means includes an input section for externally controlling said focus detection unit.

10. A focus detection device for a microscope according to claim 8, wherein said cube corner lens unit comprises a dichroic mirror and an absorption filter for determining a wavelength of the optical specimen image of the specimen.

* * * * *